Figure 13:
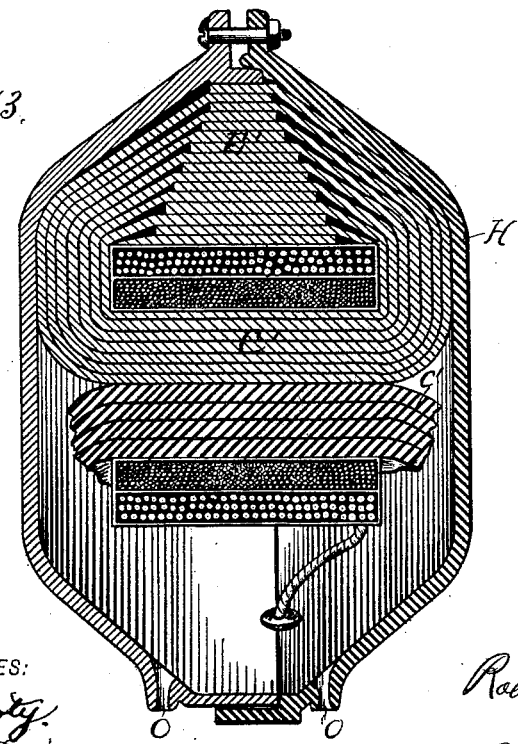

(No Model.) 4 Sheets—Sheet 1.
R. H. HASSLER.
ELECTRICAL CONVERTER.
No. 523,572. Patented July 24, 1894.
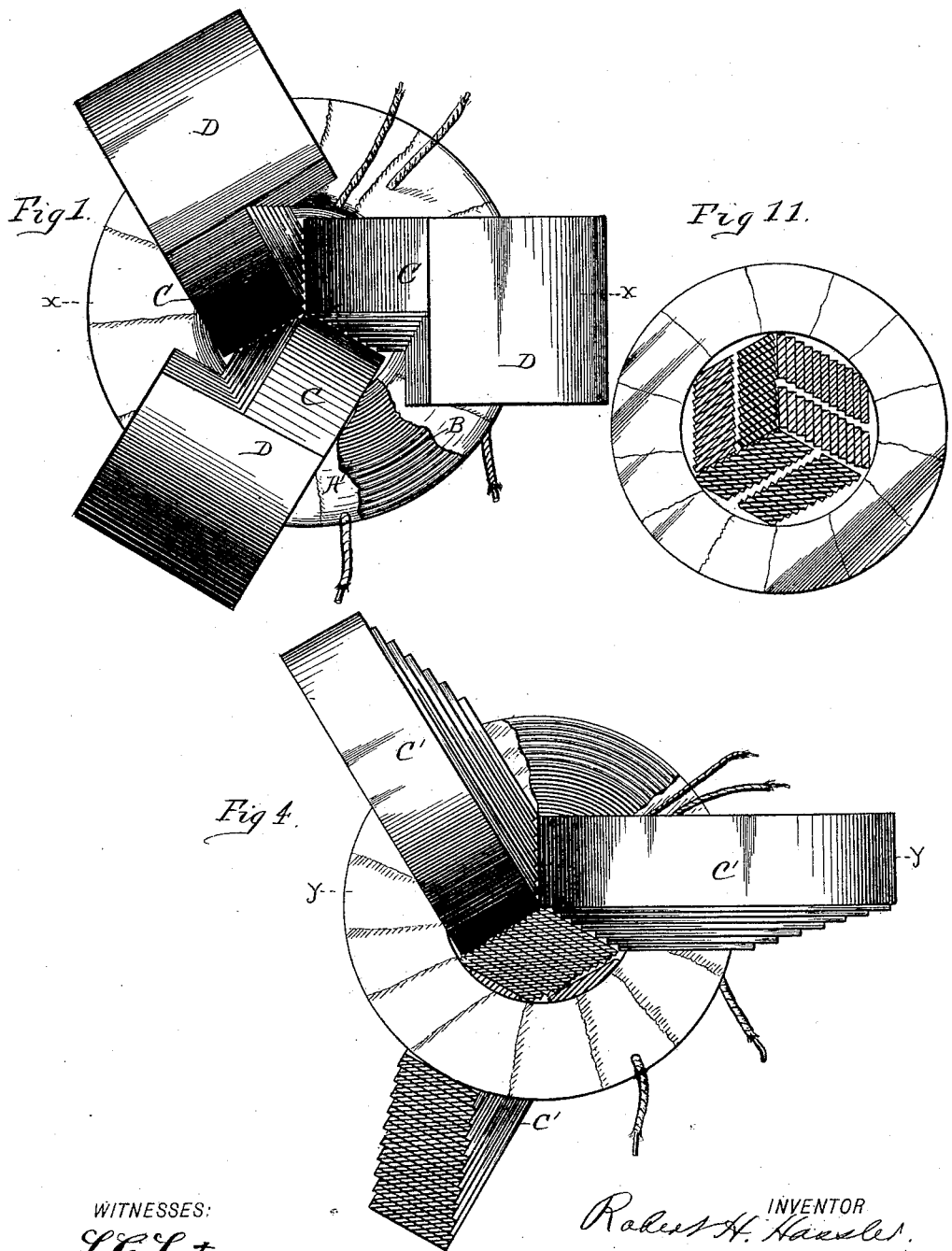
WITNESSES:
INVENTOR
Robert H. Hassler.
BY
R. Jay McCarty
ATTORNEY (No Model.)　　　　　　　　　　　　　　　　4 Sheets—Sheet 2.
R. H. HASSLER.
ELECTRICAL CONVERTER.
No. 523,572.　　　　　　　　　Patented July 24, 1894.
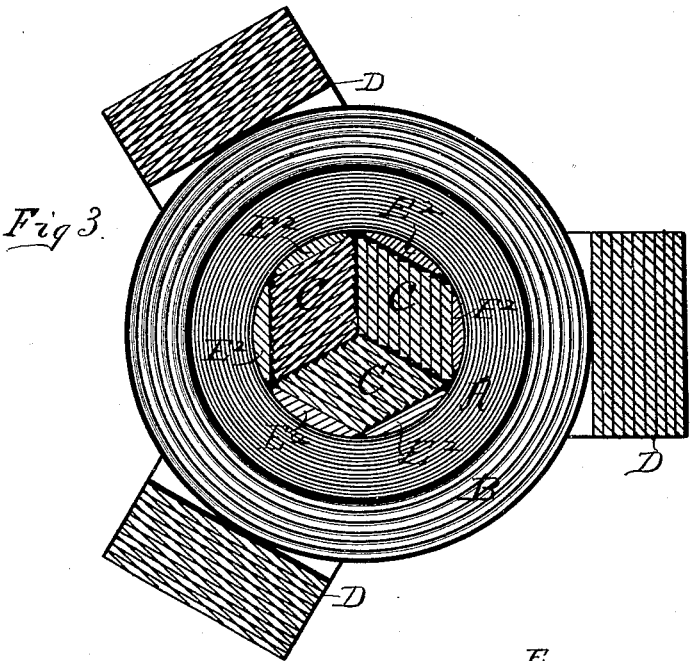
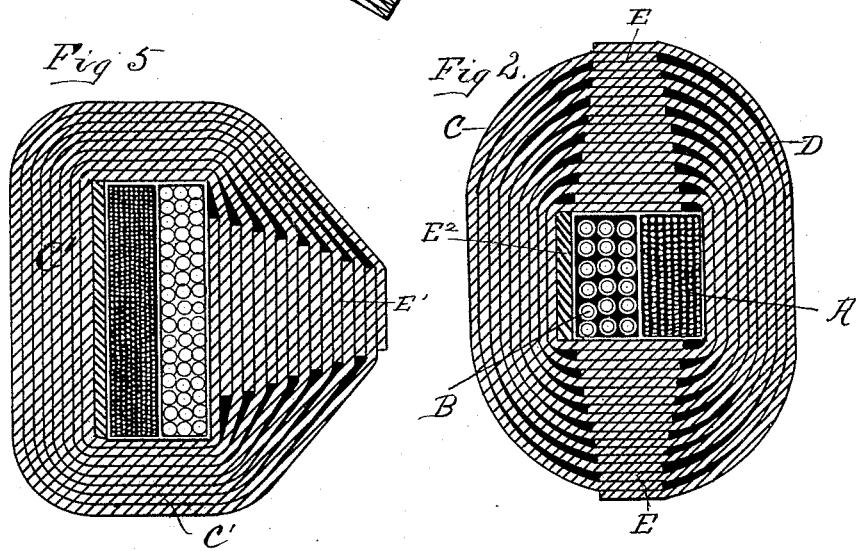
WITNESSES:　　　　　　　　　　　　　　INVENTOR
　　　　　　　　　　　　　　　　　Robert H. Hassler.
　　　　　　　　　　　　　　　　　　BY
　　　　　　　　　　　　　　　　　R. Jay M. Carty
　　　　　　　　　　　　　　　　　　ATTORNEY.

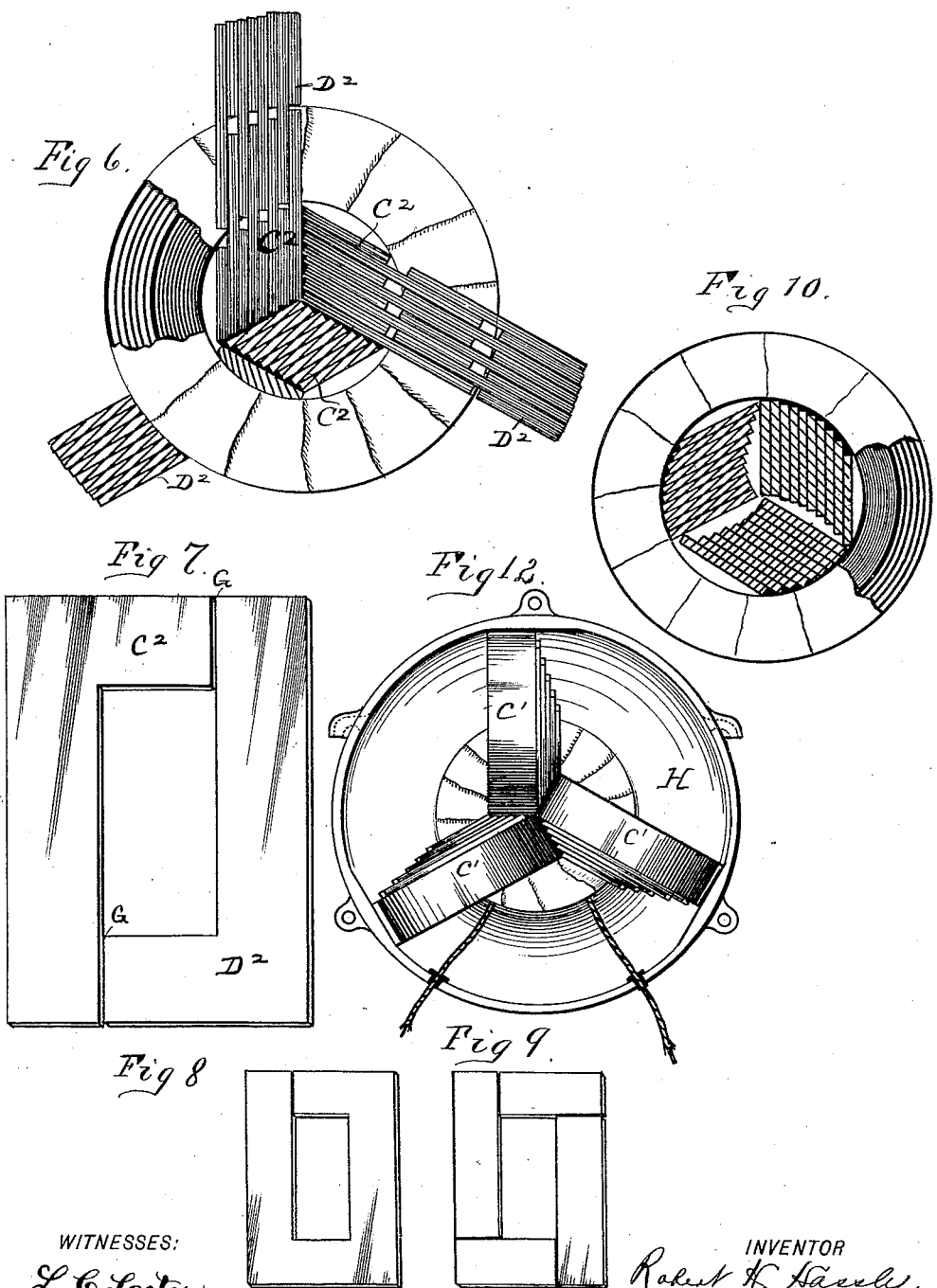

(No Model.) 4 Sheets—Sheet 4.
R. H. HASSLER.
ELECTRICAL CONVERTER.

No. 523,572. Patented July 24, 1894.

WITNESSES:
L. C. Leoty
H. J. Dunn

INVENTOR
Robert H. Hassler.
BY
R. Jay McCarty
ATTORNEY.

UNITED STATES PATENT OFFICE.

ROBERT H. HASSLER, OF DAYTON, OHIO.

ELECTRICAL CONVERTER.

SPECIFICATION forming part of Letters Patent No. 523,572, dated July 24, 1894.

Application filed August 4, 1893. Serial No. 482,329. (No model.)

*To all whom it may concern:*

Be it known that I, ROBERT H. HASSLER, of Dayton, county of Montgomery, State of Ohio, have invented a new and useful Improvement in Induction-Coils or Converters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in induction coils or electrical converters.

The object of the invention is to produce a converter having the primary and secondary coils of approximately cylindrical form, with the material comprising the magnetic circuit applied to the coils in such a manner as to almost completely utilize the space within the center of said coils, and at the same time, be so arranged with reference to the exterior of said coils that the radiation of heat from the coils is greatly facilitated.

To these ends my invention has reference to the manner in which I form the core of magnetic material that occupies the central aperture of the coils. In order that a closed magnetic circuit may be obtained, the ends of the central core must be connected magnetically around the exteriors of the coils; this, it is obvious may be done in different ways, as there are various methods of making the magnetic connection; it will therefore be understood that my invention is subject to sundry modifications. In these various modifications, however, the construction and arrangement of the central core are practically the same, to wit, the utilization of the space within the coils, and the enabling of a ready dissipation of the heat from the coils by having a substantial part of their surface uninclosed.

In the drawings herewith annexed and forming a supplement to the specification, views of several of the modified forms are shown.

Figure 1 is a plan view of my improved converter removed from the casing. Fig. 2 is a partial vertical section on the line X—X of Fig. 1, or a longitudinal section through one of the magnetic circuits. Fig. 3 is a horizontal section of the converter shown in Figs. 1 and 2. Fig. 4 is a view of a modified form of plate; parts are cut away to show one of the magnetic circuits in horizontal section. Fig. 5 is a partial vertical section on the line y—y of Fig. 4, or a section longitudinally through one of the magnetic circuits and the coils. Figs. 6 and 7 are views of another modified form, showing core plates of the form of a tri-square; in this form the plates are not bent around the outside of the coils but are extended in their own plane around said coils. Figs. 8 and 9 are further modifications of the core plates. They may be constructed with one joint or several joints. Figs. 10 and 11, are views showing a different arrangement of the core plates. The latter view shows a section of the core in which each of the core plates is split into two strips. Fig. 12 is a plan view of the converter with half of the casing removed. Fig. 13 is a vertical section through the converter and its casing.

A and B are the primary and secondary coils, respectively, of approximately cylindrical form, insulated from each other and inclosed in canvas or any suitable covering.

It is not essential that the coils be of a cylindrical form, but may instead, be made somewhat hexagonal in form by being wound on a mandrel of hexagonal section, thereby leaving the central opening hexagonal instead of circular.

The central core is composed of plates C, C, C, of soft iron, divided into three groups; the plates of each group occupying different planes and assembled in such a manner that if a transverse section of the core is taken (as in Fig. 3) the outline of the section is approximately that of a hexagon. The plates thus constituting the core are placed in the central aperture of the coil A.

D, D, D, are similar groups of plates arranged around the periphery of the coils. The ends of these plates, C and D are then bent at right angles alternately across the ends of the coils, forming overlapping joints as shown at E, Fig. 2.

The three groups of iron C, conjointly with the outer groups D, which are in metallic contact with each other, form three independent closed magnetic circuits around the primary and secondary coils with joints in the magnetic circuits at the ends of the coils. If the coils are cylindrical in form, this construction of core will leave six intervening spaces between the core and the coils; these spaces may with advantage, be filled by wooden wedges $E^2$, or they may be left open for the purposes of ventilation, or these spaces may be dispensed with by making the coils hexagonal in form.

In the magnetic circuits shown in Figs. 4 and 5, C' indicates core plates of sufficient length to extend entirely around the ends of the coils and form closed magnetic circuits of themselves, without the aid of the plates D, to inclose the outer periphery of the coils. By the adoption of the core plates C' the overlapping joints may occur at the periphery of the coils as at E', Fig. 5, or the plates may with equal advantage join at the ends of the coils.

$C^2$ and $D^2$ Figs. 6 and 7, represent plates of another form; these plates may be placed around the coils without being bent, and subserve the same function as those hereinbefore described. Each core plate $C^2$ with its companion outer plate $D^2$ complete a rectangular plate with joints G, or it may be constructed in accordance with Figs. 8 and 9. It will thus be seen that slight changes may be made in all of these constructions without departing from my invention.

It is possible to construct an induction coil or converter of primary and secondary coils and a central magnetic core, therefore I do not wish to limit myself to any particular method of joining the ends of the core to form closed magnetic circuits.

H is a metal casing suitable for inclosing converters of the form shown in Figs. 1 and 4, this case is made in halves as shown in Figs. 12 and 13, and is adapted to make contact with the magnetic material, leaving necessary space between the coils and case for ventilation. The parts of the case conform to the shape of the magnetic material, so that when bolted together the case clamps the plates of magnetic material firmly, and comes in contact with them for a considerable portion of their length. This contact of the metal case with the magnetic material is of great importance, as it facilitates the dissipation of the heat generated by the alternate magnetization and demagnetization of the magnetic material. The openings O provide for the circulation of air through the interior of the case, which, coming in contact with the coils and plates, aids materially in keeping the converter cool.

The action of the coils of wire and the magnetic material, and the connection of the converter with the dynamo are familiar to those conversant with the art, and therefore have not been detailed herein.

Having described my invention, I claim—

1. In an induction coil or converter, the combination of the primary and secondary coils, a magnetic core composed of plates of iron arranged in groups, the plates comprising said groups occupying different planes so that the planes of the respective groups are on an angle of about one hundred and twenty degrees, thereby forming a bundle or magnetic core of approximately hexagonal section.

2. In an induction coil or converter, the combination of the primary and secondary coils, and a magnetic core consisting of iron plates extending around the exterior of said coils and assembled in groups forming closed magnetic circuits, the core being of approximately hexagonal section, and the coils having a major portion of their surface uninclosed by said magnetic circuits.

3. In an induction coil or converter, the combination with the primary and secondary coils; of a magnetic core composed of plates of iron arranged in groups, said plates occupying different planes and forming a bundle or core of approximately hexagonal section, the ends of said core being magnetically connected around the exterior of the coils, and each group forming a closed magnetic circuit.

4. In an induction coil or converter, the combination with primary and secondary coils of approximately cylindrical form, a core composed of iron plates occupying different planes and arranged in groups, said groups forming a bundle or core of approximately hexagonal section, the ends of said core being magnetically connected around the exterior of the coils; of a metallic case constructed in two parts and clamped together in contact with the plates of magnetic material whereby said plates are made secure; openings in the casing for ventilation, substantially as described.

In testimony whereof I have hereunto set my hand this 1st day of August, 1893.

ROBERT H. HASSLER.

Witnesses:
J. D. CLARK,
R. JAY MCCARTY.